(12) United States Patent
Ross et al.

(10) Patent No.: US 8,918,680 B2
(45) Date of Patent: Dec. 23, 2014

(54) TRACE QUEUE FOR PERIPHERAL COMPONENT

(75) Inventors: Diarmuid P. Ross, Mountain View, CA (US); Douglas C. Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 13/355,661

(22) Filed: Jan. 23, 2012

(65) Prior Publication Data

US 2013/0191693 A1  Jul. 25, 2013

(51) Int. Cl.
*G06F 11/00* (2006.01)
(52) U.S. Cl.
USPC .............................. 714/45; 710/18
(58) Field of Classification Search
None
See application file for complete search history.

(56) References Cited

U.S. PATENT DOCUMENTS

| | | | |
|---|---|---|---|
| 3,895,353 A | 7/1975 | Dalton | |
| 4,023,143 A | 5/1977 | Braunstein | |
| 4,272,819 A | 6/1981 | Katsumata et al. | |
| 5,347,649 A * | 9/1994 | Alderson | 719/312 |
| 5,742,787 A | 4/1998 | Talreja | |
| 5,745,724 A | 4/1998 | Favor et al. | |
| 5,799,165 A | 8/1998 | Favor et al. | |
| 5,881,261 A | 3/1999 | Favor et al. | |
| 5,884,059 A | 3/1999 | Favor et al. | |
| 6,055,579 A | 4/2000 | Goyal et al. | |
| 6,108,743 A | 8/2000 | Debs et al. | |
| 6,286,035 B1 | 9/2001 | Gillis et al. | |
| 6,591,329 B1 | 7/2003 | Kakinuma et al. | |
| 6,604,210 B1 * | 8/2003 | Alexander et al. | 714/39 |
| 6,633,564 B1 | 10/2003 | Steer et al. | |
| 6,633,950 B1 | 10/2003 | Brown et al. | |
| 6,662,203 B1 | 12/2003 | Kling et al. | |
| 6,754,751 B1 | 6/2004 | Willke | |
| 7,155,568 B2 | 12/2006 | Richard et al. | |
| 8,031,536 B2 | 10/2011 | Yamagami et al. | |
| 8,131,889 B2 | 3/2012 | Lee et al. | |
| 8,396,994 B1 | 3/2013 | Lee et al. | |
| 2002/0194401 A1 * | 12/2002 | Sakugawa | 710/28 |
| 2005/0033553 A1 * | 2/2005 | Swaine et al. | 702/176 |
| 2005/0039078 A1 * | 2/2005 | Bradley et al. | 714/25 |
| 2005/0107077 A1 | 5/2005 | Hintermeier et al. | |
| 2005/0120151 A1 | 6/2005 | Furukawa et al. | |
| 2005/0120337 A1 | 6/2005 | Serrano et al. | |
| 2005/0185790 A1 | 8/2005 | Le Quere | |
| 2005/0246504 A1 | 11/2005 | Frey et al. | |
| 2005/0262309 A1 | 11/2005 | Frey et al. | |
| 2006/0193260 A1 | 8/2006 | George | |
| 2007/0006150 A9 | 1/2007 | Walmsley | |

(Continued)

OTHER PUBLICATIONS

Office Action from U.S. Appl. No. 13/220,940, mailed May 8, 2013, Diarmuid P Ross, pp. 1-16.

(Continued)

*Primary Examiner* — Gabriel Chu
(74) *Attorney, Agent, or Firm* — Lawrence J. Merkel; Meyertons, Hood, Kivlin, Kowert & Goetzel, P.C.

(57) ABSTRACT

In an embodiment, a peripheral component may include multiple sources of commands, such as command queues and/or macro memories. The commands may be performed in the peripheral component and may result in an error. The peripheral component may include a trace queue into which the commands may be written, independent of the source of the commands. Thus, the trace queue may provide a record of recently performed commands.

16 Claims, 10 Drawing Sheets

(56) References Cited

U.S. PATENT DOCUMENTS

| | | | |
|---|---|---|---|
| 2007/0162658 A1 | 7/2007 | Furukawa et al. | |
| 2007/0168993 A1* | 7/2007 | Gopal et al. | 717/128 |
| 2008/0127187 A1* | 5/2008 | Xu et al. | 718/101 |
| 2008/0137675 A1 | 6/2008 | Pauwels | |
| 2009/0007075 A1* | 1/2009 | Edmark et al. | 717/128 |
| 2009/0064154 A1 | 3/2009 | Aulbach | |
| 2009/0150728 A1* | 6/2009 | Barlow et al. | 714/718 |
| 2009/0172308 A1 | 7/2009 | Prins et al. | |
| 2009/0248975 A1 | 10/2009 | Daud et al. | |
| 2009/0249013 A1 | 10/2009 | Daud et al. | |
| 2009/0292865 A1 | 11/2009 | Hong | |
| 2010/0110085 A1 | 5/2010 | Samuel et al. | |
| 2010/0318752 A1* | 12/2010 | Schwarz et al. | 711/154 |
| 2011/0026318 A1 | 2/2011 | Franceschini et al. | |
| 2011/0055453 A1 | 3/2011 | Bennett | |
| 2011/0113167 A1 | 5/2011 | Lee et al. | |
| 2011/0321052 A1 | 12/2011 | Long et al. | |
| 2012/0102263 A1 | 4/2012 | Aswadhati et al. | |
| 2013/0080660 A1 | 3/2013 | Lee et al. | |

OTHER PUBLICATIONS

U.S. Appl. No. 13/347,119, filed Jan. 10, 2012, inventor Ross et al.

U.S. Appl. No. 13/220,940, filed Aug. 30, 2011, inventor Ross et al.

Office Action from U.S. Appl. No. 13/220,940, mailed Nov. 12, 2013, pp. 1-15.

International Preliminary Report on Patentability from PCT/US2012/051898, dated Mar. 13, 2014, pp. 1-6.

Office Action from U.S. Appl. No. 13/347,119, issued Mar. 11, 2014, pp. 1-105.

CP1300 Fetch-Decode-Execute, Jun. 11, 2000, retrieved from http://www.cs.miami.edu/-geoff/Courses/JCUSubjects/CP1300/Content/Architecture/Fetch DecodeExecute.shtml on Mar. 3, 2014 (1 page).

Definition integrated circuit (IC), Margaret Rouse, WhatIs.com, Sep. 2005, retrieved from http://whatis.techtarget.com/definition/integrated-circuit-IC on Mar. 3, 2014.

Improving read performance of Phase Change Memories via Write Cancellation and Write Pausing, Qureshi et al, 2010 IEEE 16th International Symposium on High Performance Computer Architecture (HPCA), Jan. 9-14, 2010, pp. 1-11 (11 pages).

definition of responsive, Google Define, retrieved from https://www.google.com/search?q=define%3A+responsive&oq=define%3A+responsive&aqs=chrome.0.57j58j62.7502&sugexp=chrome mo=O&sourceid=chrome&ie=UTF-8 on Feb. 26, 2014 (1 page).

* cited by examiner

| CMD Byte | Up to 3 Operand Bytes | CS | OS |

| Command | Operands | Words |
|---|---|---|
| addr0 | None | 1 |
| addr1 | One Byte of Address | 1 |
| addr2 | Two Bytes of Address | 1 |
| addr3 | Three Bytes of Address | 1 |
| addr4 | Four Bytes of Address | 2 |
| addr5 | Five Bytes of Address | 2 |
| addr6 | Six Bytes of Address | 2 |
| addr7 | Seven Bytes of Address | 2 |
| cmd | Command Byte for Flash Memory | 1 |
| enable_chip | Chip Enables for Flash Memory | 1 |
| wait_for_rdy | Code, Mask, and Condition | 1 |
| xfer_page | None | 1 |
| send_interrupt | Interrupt Code | 1 |
| pause | None | 1 |
| timed_wait | Number of Clock Cycles | 1 |
| load_next_word | Register Address, Value | 2 |
| load_from_fifo | Register Address | 1 |
| macro | Address, Length, Loop Count | 1 |
| poll | Register Address, Mask, Value | 3 |
| wait_for_int | Irq, Bit | 1 |

TRACE QUEUE FOR PERIPHERAL COMPONENT

BACKGROUND

1. Field of the Invention

This invention is related to the field of integrated circuits and, more particularly, to command processing in a peripheral component in an integrated circuit.

2. Description of the Related Art

In a peripheral interface controller that has significant data bandwidth, one of the challenges that can occur is providing the control input to the peripheral interface controller from an external processor. Typically, the same internal interface to the peripheral controller that transfers data between the peripheral interface controller and memory is used to provide the control input from the external processor (e.g. via a series of writes to control registers in the peripheral interface controller). While the data transfers are occurring, the memory to peripheral interface can be saturated with the data transfers. Accordingly, control inputs to arrange for the next set of data transfers can be effectively locked out until the current data transfers complete. During the time that the control inputs are being provided, the external peripheral interface controlled by the peripheral interface controller can be idle.

One mechanism for reducing the contention on the peripheral to memory interface is to include a processor in the peripheral interface controller, executing a program to control the peripheral interface controller hardware. However, such a mechanism is expensive in a number of ways: in monetary terms to acquire the processor (either as a discrete component or as intellectual property that can be incorporated into the peripheral interface controller design); in terms of space occupied by the peripheral interface controller when the processor is included; and in terms of power consumed by the processor. Additionally, the program to be executed is stored in the system memory, and thus instruction fetches can compete with the data transfers on the peripheral to memory interface.

In some cases, a peripheral interface controller can detect erroneous operation, and can report the error. For example, the peripheral interface controller can interrupt the processor that programmed the peripheral interface controller or a processor functioning as a central processing unit (CPU) in the system. Alternatively, the peripheral interface controller can record the error in a register or other facility that can be read by software executing on one of the processors. Once software is aware of the error, it generally must ascertain what sequence of operations has occurred to cause the error.

SUMMARY

In an embodiment, an integrated circuit includes a peripheral component configured to control an external interface of the integrated circuit. For example, the peripheral component may be a memory interface unit such as a flash memory interface unit. The internal interface to the peripheral component may be shared between data transfers to/from the external interface and at least some control communications to the peripheral component. The peripheral component may include a low priority command queue configured to store a set of commands to perform a transfer on the interface. Additionally, the peripheral component may include a high priority command queue configured to store a second set of commands to perform a transfer on the interface, and the low priority command sequence may be interrupted to perform the higher priority sequence. In some embodiments, the peripheral component may include a macro memory storing command sequences that may be frequently reused, and the commands may include a macro command that calls a command sequence in the macro memory. Accordingly, the peripheral component may support a flexible and efficient mechanism for programming the data transfers to be performed by the component.

With multiple sources of commands, software executing on the processor that generates the commands may be challenged when attempting to ascertain the sequence of commands being performed when an error occurs. In an embodiment, the peripheral interface controller may include a trace queue configured to store a set of most recently performed commands. The peripheral interface control may write commands into the trace queue as the commands are read and performed, independent of the source of the commands. In the case that a source changes (e.g. a macro command is encountered, or a high priority command set is loaded in the high priority command queue and interrupts that low priority command queue), the final instruction from the original source and the initial instruction from the new source may be adjacent in the queue. Thus, the task of determining the sequence of commands that were performed prior to the error may be simplified.

BRIEF DESCRIPTION OF THE DRAWINGS

The following detailed description makes reference to the accompanying drawings, which are now briefly described.

FIG. 4 is a block diagram illustrating an exemplary entry in one embodiment of a trace first-in, first-out buffer (FIFO) shown in FIG. 2.

FIG. 5 is a table illustrating one embodiment of commands supported by the flash memory interface control circuit.

Figure 1:
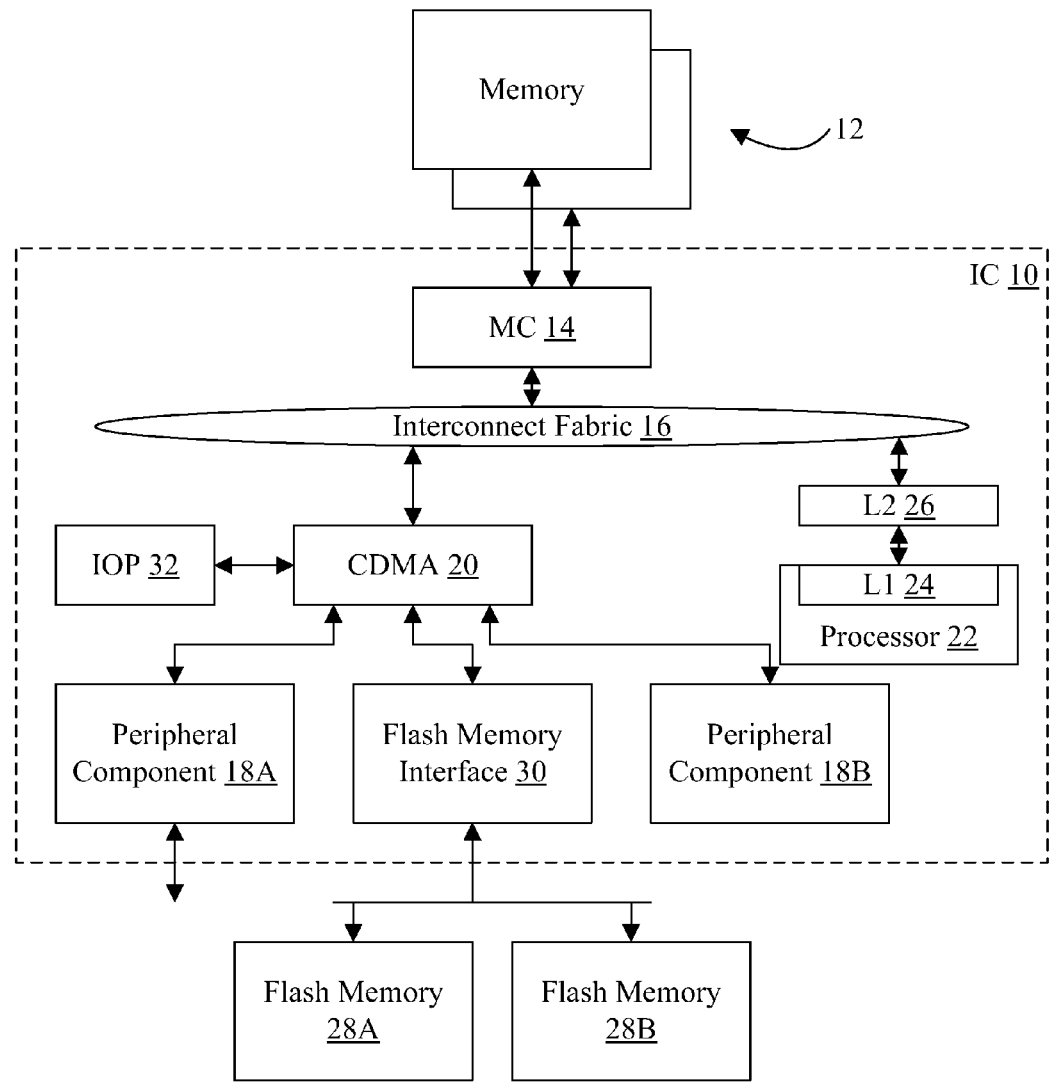
FIG. 1 is a block diagram of one embodiment of an integrated circuit, a memory, and a flash memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of an integrated circuit 10 coupled to an external memory 12 and one or more flash memory devices 28A-28B is shown. In the illustrated embodiment, the integrated circuit 10 includes a memory controller 14, an interconnect fabric 16, a set of peripheral components such as components 18A-18B, a flash memory interface unit 30, a central DMA (CDMA) controller 20, a processor 22 including a level 1 (L1) cache 24, a level 2 (L2) cache 26, and an input/output (I/O) processor (IOP) 32. The memory controller 14 is coupled to a memory interface to which the memory 12 may be coupled, and is coupled to the interconnect fabric 16. The CDMA controller 20, the L2 cache 26, and the processor 22 (through the L2 cache 26) are also coupled to the interconnect fabric 16 in the illustrated embodiment. The L2 cache 26 is coupled to the processor 22, and the CDMA controller 20 is coupled to the components 18A-18B, the flash memory interface unit 30, and the IOP 32. One or more peripheral components 18A-18B may be coupled to external interfaces as well, such as the peripheral component 18A. In other embodiments, other components may be coupled to the interconnect fabric 16 directly (e.g. other peripheral components).

The CDMA controller 20 may be configured to perform DMA operations between the memory 12, various peripheral components 18A-18B, and/or the flash memory interface unit 30. Various embodiments may include any number of peripheral components and/or flash memory interface units 30 coupled through the CDMA controller 20. The processor 22 (and more particularly, instructions executed by the processor 22) may program the CDMA controller 20 to perform DMA operations. Various embodiments may program the CDMA controller 20 in various ways. For example, DMA descriptors may be written to the memory 12, describing the DMA operations to be performed, and the CDMA controller 20 may include registers that are programmable to locate the DMA descriptors in the memory 12. Multiple descriptors may be created for a DMA channel, and the DMA operations described in the descriptors may be performed as specified. Alternatively, the CDMA controller 20 may include registers that are programmable to describe the DMA operations to be performed, and programming the CDMA controller 20 may include writing the registers.

Generally, a DMA operation may be a transfer of data from a source to a target that is performed by hardware separate from a processor that executes instructions. The hardware may be programmed using instructions executed by the processor, but the transfer itself is performed by the hardware independent of instruction execution in the processor. At least one of the source and target may be a memory. The memory may be the system memory (e.g. the memory 12), the flash memory devices 28A-28B, or may be an internal memory in the integrated circuit 10, in some embodiments. Some DMA operations may have memory as a source and a target (e.g. a DMA operation between the memory 12 and the flash memory devices 28A-28B, or a copy operation from one block of the memory 12 to another). Other DMA operations may have a peripheral component as a source or target. The peripheral component may be coupled to an external interface on which the DMA data is to be transferred or on which the DMA data is to be received. For example, the peripheral component 18A may be coupled to an interface onto which DMA data is to be transferred or on which the DMA data is to be received. Thus, a DMA operation may include the CDMA controller 20 reading data from the source and writing data to the destination. The data may flow through the CDMA controller 20 as part of the DMA operation. Particularly, DMA data for a DMA read from the memory 12 may flow through the memory controller 14, over the interconnect fabric 16, through the CDMA controller 20, to the peripheral component 18A-18B or the flash memory interface unit 30 (and possibly on the interface to which the peripheral component is coupled, if applicable). Data for a DMA write to memory may flow in the opposite direction.

In one embodiment, instructions executed by the processor 22 and/or the IOP 32 may also communicate with the peripheral components 18A-18B and the flash memory interface unit 30 using read and/or write operations referred to as programmed input/output (PIO) operations. The PIO operations may have an address that is mapped by the integrated circuit 10 to a peripheral component 18A-18B or the flash memory interface unit 30 (and more particularly, to a register or other readable/writeable resource in the component). The address mapping may be fixed in the address space, or may be programmable. Alternatively, the PIO operation may be transmitted in a fashion that is distinguishable from memory read/write operations (e.g. using a different command encoding than memory read/write operations on the interconnect fabric 16, using a sideband signal or control signal to indicate memory vs. PIO, etc.). The PIO transmission may still include the address, which may identify the peripheral component 18A-18B or the flash memory interface unit 30 (and the addressed resource) within a PIO address space, for such implementations. The addressed resource may be any resource within the addressed component/unit, such as a configuration or control register, a logical resource (e.g. the PIO may be interpreted as a command), etc.

In one embodiment, PIO operations may use the same interconnect as the CDMA controller 20, and may flow through the CDMA controller 20, for peripheral components 18A-18B and the flash memory interface unit 30. Thus, a PIO operation may be issued by the processor 22 onto the interconnect fabric 16 (through the L2 cache 26, in this embodiment), to the CDMA controller 20, and to the targeted peripheral component/flash memory interface unit. Similarly, the IOP 32 may issue PIO operations to the CDMA controller 20, which may transmit the PIO operation over the same interconnect to the peripheral components 18A-18B or the flash memory interface unit 30. In other embodiments, PIO operations may not flow through the CDMA controller 20, but still may share a portion of the path to the flash memory interface unit 30 with the CDMA controller 20.

Accordingly, data transfers for a DMA operation to/from a peripheral component 18A-18B or the flash memory interface unit 30 may conflict with PIO operations to/from the same peripheral component 18A-18B or the flash memory interface unit 30. For example, the flash memory interface unit 30 may be programmed via PIO operations to perform memory transfers to/from the flash memory devices 28A-28B. For write operations, the CDMA controller 20 may DMA the data to be written to the flash memory interface unit 30. For read operations, the CDMA controller 20 may DMA the data to be read from the flash memory interface unit 30. In an embodiment, flash memory devices 28A-28D may support a page of data transfer to/from the devices. The size of the page is device-dependent, and may not be the same as the page size used for virtual-to-physical address translation for the memory 12. For example, page sizes of 512 bytes, 2048 bytes, and 4096 bytes are often used. Accordingly, a page may be the unit of transfer of data for the memory device, in this context.

The flash memory interface unit 30 may be programmed to perform a page of data transfer, and the CDMA unit 20 may perform the DMA operations to transfer the data. If multiple pages are to be transferred, additional PIO operations may be used to program the flash memory interface unit 30 to perform the next transfer. However, the DMA operations may effectively lock out the additional PIO operations until the current page completes. Thus, the time elapsing while programming the flash memory interface unit 30 for the next page may result in idle time on the interface to the flash memory devices.

Additionally, a DMA transfer may be initiated, and then a higher priority data transfer may be needed in the IC 10. For example, with regard to the flash memory interface unit 30, the on-going DMA transfer may be initiated by an application, and then the operating system may need to page out data to the flash memory 28A-28B or read data from the flash memory 28A-28B to satisfy a page fault. Alternatively, an application that is executing in the background may have started a DMA transfer, and an actively-used (foreground) application may need to perform a transfer. In another example, applications may be assigned priorities. In yet another example, hardware in the IC 10 may require access to the flash memory 28A-28B and may be higher priority than software access.

In one embodiment, the flash memory interface unit 30 may support multiple command queues. Commands to program the flash memory interface unit 30 for a set of pages to be transferred may be queued in one of the command queues. Once the DMA operations for the first page begin, the data to program the flash memory interface unit 30 for subsequent pages may already be stored in the command queue. Accordingly, there may be no conflict between the PIO operations to program the flash memory interface unit 30 and the DMA operations to transfer the data. The utilization on the interface to the flash memory devices 28A-28B may be increased due to the ability to process the commands from the command queue to configure the flash memory controller 30 for the next page to be transferred while the CDMA unit 30 completes the DMA operations for the current page.

Furthermore, the command queues may have a priority associated with them. For example, two queues may be included: One may be a low priority queue and the other may be a high priority queue. The flash memory interface unit 30 may be configured to interrupt processing of commands in the low priority queue if there are commands in the high priority queue to be processed. Thus, a higher-priority transfer may interrupt a lower-priority transfer. In one embodiment, the low priority queue may include one or more indications that identify locations in the command stream at which interruption is permissible. The indications may ensure that the interruption occurs at a "good" place in the commands (e.g. at the end of a page, at a synchronization point, etc.). That is, the operations that were occurring in the low priority queue at the time commands are written to the high priority queue may be completed, so that those operations do not need to be performed again after the high priority processing has finished. In one embodiment, the queues may be statically assigned as high priority or low priority. In other embodiments, the priority may be programmable.

In an embodiment, the flash memory interface unit 30 may support a macro memory to store one or more macros. A macro may be a sequence of two or more commands that may be invoked via a macro command. For example, the macro command may be written to one of the command queues, and may invoke the macro when the macro command is performed by the flash memory interface unit 30. Macros that implement frequently-used sequences of commands may be downloaded to the macro memory, and thus fewer commands need be downloaded subsequently. That is, macro commands may be written to the command queue instead of repeatedly writing the commands that are stored in the macro. In one embodiment, the macro command may specify a starting address of the macro and a number of words in the macro. Once the number of words have been read from the macro and the corresponding commands have been performed, the next command in the corresponding command queue after the macro command may be performed. Accordingly, return commands may be avoided in the macro, permitting more dense macros in an embodiment. Other embodiments may use the starting address and a number of commands as operands. Still other embodiments may implement a return command and the macro command may include the starting address (but not word/command count) as an operand. In an embodiment, the macro command may also include a loop count operand. The loop count operand may specify a number of iterations of the macro that are to be performed. Thus, performing the macro command may include reading the number of words beginning at the starting address and performing the commands, iterated the loop count number of times, before proceeding with the next command in the command queue after the macro command.

The combination of the various command queues and macro memory may provide a flexible, efficient mechanism for the control of transfers in the flash memory interface unit 30. However, the mechanism includes several sources of commands (and in some cases, several sources of operands as discussed in more detail below). When an error or other exceptional condition occurs and the flash memory interface unit 30 reports the error/exception to the processor that programs the commands (e.g. the IOP 32 or the processor 22), the flexibility becomes a source of complexity in determining the commands that were processed prior to detecting the error. The flash memory interface unit 30 may support a trace queue into which the commands (or data describing the commands)

may be written in the order that the commands are performed. Commands from any source may be written to the trace queue, and thus the most recently performed commands may be available in the trace queue even though the commands may have different sources (e.g. different command queues, or the macro memory). Accordingly, software may more easily and rapidly ascertain which commands were being processed just prior to the occurrence of the error, in some embodiments. Similarly, the trace queue may capture operand data along with the command. The operand data may have more than one possible source as well, as discussed below. Software may more easily and rapidly ascertain the operand data because of the trace queue.

Commands in the command queues and/or commands in the macro memory may use operands to control their operation. In some cases, the operands may be stored in the corresponding command queue. In other cases, the operands may be stored in an operand queue. Commands in the command queue or in the macro memory may specify that the flash memory interface unit 30 load operands from the operand queue and operate on the operands. The operand queue may be used with a macro to supply instance-specific data for the generic macro (e.g. flash memory addresses, chip enables, etc.). Similarly, the operand queue may supply operands for the commands in the command queue.

A memory transfer, as used herein, may refer to the transfer of data to/from a memory device (via the interface to the memory device). Thus, a memory transfer to/from the flash memory devices 28A-28B may occur over the interface between the flash memory devices 28A-28B and the flash memory interface unit 30. Similarly, a memory transfer to/from the memory 12 may occur over the interface between the memory 12 and the memory controller 14. The memory transfer may occur using a protocol defined by the memory devices. Additionally, a command may refer to one or more bytes of data that are interpreted by the hardware in the peripheral component (e.g. the flash memory interface unit 30) as specifying a particular operation to be performed by the hardware.

Generally, a peripheral component may be any desired circuitry to be included on the integrated circuit 10 with the processor. A peripheral component may have a defined functionality and interface by which other components of the integrated circuit 10 may communicate with the peripheral component. For example, peripheral components may include video components such as display controllers, graphics processors, etc.; audio components such as digital signal processors, mixers, etc.; networking components such as an Ethernet media access controller (MAC) or a wireless fidelity (WiFi) controller; controllers to communicate on various interfaces such as universal serial bus (USB), peripheral component interconnect (PCI) or its variants such as PCI express (PCIe), serial peripheral interface (SPI), flash memory interface, etc. The flash memory interface unit 30 may be one example of a peripheral component, and the general properties of a peripheral component described herein may be applicable to the flash memory interface unit 30.

The processor 22 may implement any instruction set architecture, and may be configured to execute instructions defined in that instruction set architecture. The processor 22 may employ any microarchitecture, including scalar, superscalar, pipelined, superpipelined, out of order, in order, speculative, non-speculative, etc., or combinations thereof. The processor 22 may include circuitry, and optionally may implement microcoding techniques. In the illustrated embodiment, the processor 22 may include an L1 cache 24 to store data and instructions for use by the processor 22. There may be separate L1 data and instruction caches. The L1 cache(s) may have any capacity and organization (set associative, direct mapped, etc.). In the illustrated embodiment, an L2 cache 26 is also provided. The L2 cache 26 may have any capacity and organization, similar to the L1 cache(s).

Similarly, the IOP 32 may implement any instruction set architecture, and may be configured to execute instructions defined in that instruction set architecture. The instruction set architecture implemented by the IOP 32 need not be the same instruction set architecture implemented by the processor 22. In one embodiment, the IOP 32 may be a lower power, lower performance processor than the processor 22. The IOP 32 may handle various I/O interface issues (configuring peripheral components to perform desired operations, certain error handling, etc.). The IOP 32 may execute instructions to write commands to the command queue in the flash memory interface unit 30, write macros to the macro memory in the flash memory interface unit 30, and/or write operands to the operand queue in the flash memory interface 30. The IOP 32 may further execute instructions to service other peripheral components 18A-18B. Thus, the processor 22 may perform other computing tasks, or many be powered down to conserve power if there are no other computing tasks to be performed. The IOP 32 may employ any microarchitecture, including scalar, superscalar, pipelined, superpipelined, out of order, in order, speculative, non-speculative, etc., or combinations thereof. The IOP 32 may include circuitry, and optionally may implement microcoding techniques.

The interconnect fabric 16 may be any interconnect over which the memory controller 14, the processor 22 (through the L2 cache 26), the L2 cache 26, and the CDMA controller 20 may communicate. The interconnect fabric 16 may implement any type of interconnect (e.g. a bus, a packet interface, point to point links, etc.). In one embodiment, the interconnect fabric 16 may be a hierarchy of interconnects. For example, the processor 22 and caches 24 and 26 may be implemented in a "core complex" that includes a coherence port and a port to the memory controller 14. The CDMA controller 20 may be coupled to the coherency port. In some embodiments, the memory controller 14 may be multi-ported. In some such embodiments, the CDMA controller 20 may be coupled to a separate port on the memory controller 14. In other such embodiments, the CDMA controller 20 may still be coupled through the ACP port.

The memory controller 14 may be configured to receive memory requests from the system interface unit 16. The memory controller 14 may be configured to access the memory 12 to complete the requests (writing received data to the memory 12 for a write request, or providing data from the memory 12 in response to a read request) using the interface defined for the attached memory 12. The memory controller 14 may be configured to interface with any type of memory 12, such as dynamic random access memory (DRAM), synchronous DRAM (SDRAM), double data rate (DDR, DDR2, DDR3, etc.) SDRAM, RAMBUS DRAM (RDRAM), static RAM (SRAM), etc. The memory may be arranged as multiple banks of memory, such as dual inline memory modules (DIMMs), single inline memory modules (SIMMs), etc. In one embodiment, one or more memory chips are attached to the integrated circuit 10 in a package on package (POP) or chip-on-chip (COC) configuration.

The memory 12 may include one or more memory devices. Generally, a memory device may be any component that is designed to store data according to an address provided with the data in a write operation, and to supply that data when the address is used in a read operation. Any of the examples of memory types mentioned above may be implemented in a memory device, and the flash memory devices 28A-28B may be memory devices as well. A memory device may be a chip, multiple chips connected to a substrate such as a printed circuit board (e.g. a SIMM or DIMM, or directly connected to a circuit board to which the IC 10 is coupled), etc.

The flash memory interface unit 30 may include circuitry configured to receive read and write requests for the flash memory devices 28A-28B, and configured to interface to the flash memory devices 28A-28B to complete the read/write requests. In one embodiment, the read/write requests may be sourced from the CDMA controller 20. The flash memory interface unit 30 may be programmable via one or more control registers (see FIG. 2 described below) to perform memory transfers to/from the flash memory devices 28A-28B (e.g. via PIO operations). Flash memory devices 28A-28B may be flash memory, a type of non-volatile memory that is known in the art. In other embodiments, other forms of non-volatile memory may be used. For example, battery-backed SRAM, various types of programmable ROMs such as electrically-erasable programmable ROMs (EEPROMs), etc. may be used. In still other embodiments, volatile memory may be used similar to memory 12.

While the present embodiment describes using the command queues (FIFO), macro memory, and/or operand queue (FIFO) in the flash memory interface unit 30, other embodiments may implement the features in any peripheral component, with any type of memory or peripheral interface.

It is noted that other embodiments may include other combinations of components, including subsets or supersets of the components shown in FIG. 1 and/or other components. While one instance of a given component may be shown in FIG. 1, other embodiments may include one or more instances of the given component. Furthermore, in some embodiments, the flash memory interface unit 30 may include a local processor that may write commands to the command queues in addition to the IOP 32 and/or the processor 22. In such embodiments, the trace queue may still be desired to simplify debugging/error diagnosis.

Figure 2:
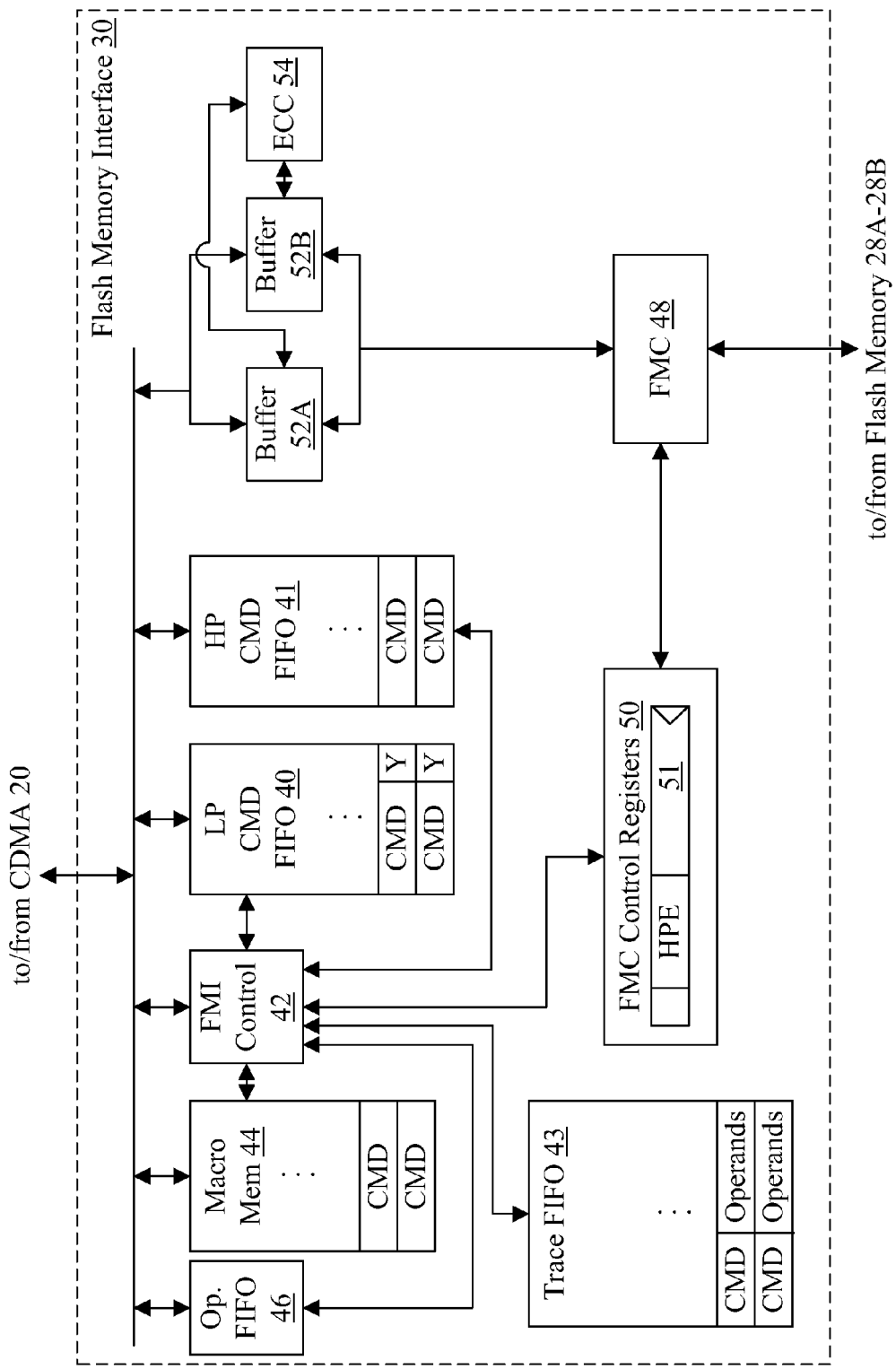
FIG. 2 is a block diagram of one embodiment of a flash memory interface illustrated in FIG. 1.

Turning now to FIG. 2, a block diagram of one embodiment of the flash memory interface unit 30 is shown. In the illustrated embodiment, the flash memory interface unit 30 includes a low priority (LP) command FIFO 40, a high priority (HP) command queue 41, a flash memory interface (FMI) control circuit 42, a trace FIFO 43, a macro memory 44, an operand FIFO 46, a flash memory controller (FMC) 48, a set of FMC control registers 50 including register 51, data buffers 52A-52B, and an error checking/correction (ECC) unit 54. The command FIFOs 40 and 41, FMI control circuit 42, macro memory 44, operand FIFO 46, and buffers 52A-52B are all coupled to an internal interface to the CDMA controller 20 (or to the interconnect fabric 16). The FMI control circuit 42 is further coupled to the command FIFOs 40 and 41, the trace FIFO 43, the macro memory 44, the operand FIFO 46, and the FMC control registers 50. The FMC control registers 50 are further coupled to the FMC 48, which is coupled to an external interface to the flash memory devices. The FMC 48 is further coupled to the buffers 52A-52B. The ECC unit 54 is also coupled to the buffers 52A-52B.

The FMI control circuit 42 may be configured to receive PIO operations from the CDMA controller 20/interconnect fabric 16 (or a local processor, in some embodiments). Some PIO operations may be directed to the command FIFOs 40 and 41, the macro memory 44, or the operand FIFO 46. For example, PIO writes may be used to write commands into the command FIFOs 40 or 41, to download macros into the macro memory 44, or to write operands into the operand FIFO 46. Addresses may be assigned to each of the FIFOs 40 and 41, the macro memory 44, and the operand FIFO 46, which may be used in the PIO operands to address the desired resource. For example, the FIFOs 40, 41, and 46 may have a single assigned address since they may operate in a first-in, first-out manner. A PIO write to the address may cause the FMI control circuit 42 to store the data provided with the write in the next open entry in the FIFOs 40, 41, or 46. That is, the data may be appended to the tail of the FIFO 40, 41, or 46, where commands or operands are removed from the head of the FIFO 40, 41, or 46. The macro memory 44 may have a range of addresses assigned to it, e.g. an address per word of the macro memory 44. PIO writes to the addresses may store the provided data word into the addressed word of the macro memory 44. Similarly, PIO reads may be used to read the trace FIFO 43. In one embodiment, the trace FIFO 43 may have a range of address assigned to it, e.g. an address per entry in the trace FIFO 43. PIO reads may be used to read any entry in the trace FIFO 43, and the reads may be non-destructive (e.g. the reads do not cause the data to be popped from the FIFO).

The FMI control circuit 42 may process the commands in the command FIFOs 40 or 41 to program various FMC control registers 50 to cause the FMC 48 to perform a particular memory transfer to/from the flash memory devices 28A-28B. In one embodiment, the FMC 48 is configured to receive relatively low-level control via the FMC control registers 50, including address, chip enables, transfer commands, etc. Commands in the command FIFOs 40 and 41 may be interpreted by the FMI control circuit 42 and the corresponding FMC control registers 50 may be written by the FMI control circuit 42. Similarly, commands to wait for an event may be interpreted by the FMI control circuit 42 to read one or more FMC control registers 50 to detect the event. There may also be direct control signals between the FMI control circuit 42 to the FMC 48, in some embodiments (not shown in FIG. 2) which may be driven by the FMI control circuit 42 responsive to commands and/or monitored by the FMI control circuit 42 responsive to commands. Additionally, in response to a macro command in one of the FIFOs 40 and 41, the FMI control circuit 42 may be configured to read commands from the macro memory 44.

The FMI control circuit 42 may be configured to read the commands from the command FIFOs 40 or 41 in the order written to that FIFO. More generally, command queues may be supported (e.g. the command FIFOs 40 and 41 may not be specifically constructed as FIFOs, such that each entry in the queues may be concurrently visible to the FMI control circuit 42). Similarly, the operand FIFO 46 may be an operand queue, and the FMI control circuit 42 may read operands from the operand FIFO 46 responsive to the commands in the command queue or the macro memory 44 in the order the operands were written. Operands may also be included in the command FIFOs 40 and 41 and the macro memory 44.

The FMI control circuit 42 may be configured to write data describing commands to the trace FIFO 43. The order of the commands in the FIFO 43 may be the order in which the commands were processed, independent of the source of the commands. For example, the FMI control circuit 42 may be processing commands from the FIFO 40, and then may interrupt the command sequence to perform a command sequence in the FIFO 41. The most recently performed (last) command from the FIFO 40 may be represented in an entry in the trace FIFO 43, and the initial command from the FIFO 41 may be represented in an adjacent entry. Similarly, the macro command from the FIFO 40 or 41 may be represented in the trace FIFO 43, and the initial command from the macro (read from the macro memory 44) may be represented in an adjacent entry.

The data describing the command in the trace FIFO 43 may include data from which the command can be identified. In some embodiments, the data may further include operand data. In an embodiment, each command is one byte and the command byte may be written to the corresponding entry. Additionally, up to three operand bytes may be written to the entry. Thus, the entire command and at least a portion of the operand data may be written to the entry. In other embodiments, at least a portion of the command and at least a portion of the operand data may be written to an entry. If there is more operand data than the available storage in the entry, the additional operand data may be discarded, or may be written to the next entry in the trace FIFO 43. Accordingly, the data that describes a command may include any subset of the command and its operands, all of the command and its operands, or encoded data derived from the command and/or its operands, in various embodiments.

As mentioned above, consecutively performed commands may be in adjacent entries in the trace FIFO 43. Entries may be adjacent if the entries are addressed by consecutive addresses in the trace FIFO 43. In embodiments in which additional operand data may be stored in the next entry, entries of consecutively performed commands may be adjacent if the entry storing data describing one command is consecutive to an entry storing either data describing the other command or additional operand data corresponding to the other command.

The trace FIFO 43 may include any number of desired entries. In an embodiment, 32 entries may be implemented, although more or fewer entries may be used in other embodiments. In an embodiment, the number of entries may be sufficient to store the commands (and operand data) for a complete page transfer from/to the flash memory 28A-28B. Accordingly, if an error occurs anywhere within the page transfer, the corresponding commands maybe logged in the trace FIFO 43.

If both FIFOs 40 and 41 are empty and then commands are written to the LP command FIFO 40, the FMI control circuit 42 may read commands from the LP command FIFO 40 and perform the commands. If commands are written to the HP FIFO 41 while the FMI control circuit 42 is processing commands from the LP command FIFO 40, the FMI control circuit 42 may determine a point at which to interrupt processing of the commands from the FIFO 40 to begin processing the commands from the FIFO 41. In FIG. 2, several entries in the LP command FIFO 40 are illustrated for this embodiment. In this embodiment, each entry in the LP command FIFO 40 may include storage for the command, along with a yield bit ("Y"). If the yield bit is set for a given command, the processing of commands may be interrupted after the given command is processed. If the yield bit is clear, processing may not be interrupted. The yield bits may be part of the PIO data for PIO writes to the LP command FIFO 40. In other embodiments, other indications may be used (e.g. a bit with the opposite meanings for the set and clear states, multibit values, etc.). Furthermore, other embodiments may use a separate command in the FIFO 40 to indicate interruptibility. That is, a command may be defined whose operation is to permit the FMI control circuit 40 to interrupt processing from the FIFO 40 to process commands from the FIFO 41, if there are such commands. If no commands are awaiting processing in the FIFO 41, processing in the FIFO 40 may continue with the next command.

In response to interrupt processing of the commands in the LP command FIFO 40 to process commands in the HP command FIFO 41, the FMI control circuit 42 may be configured to set the HPE bit in the register 51 in this embodiment. Once the HPE bit is set, the FMI control circuit 42 may be configured to process commands from the HP command FIFO 41, if any, but may not process commands from the LP command FIFO 40 until the HPE bit is cleared. The FMI control circuit 42 may not clear the HPE bit, but rather software may do so by writing the register 51. In this fashion, if the FMI control circuit 42 empties the HP command FIFO 41 before software finishes filling the command FIFO 41 (e.g. due to interruption of the software, delays in transmitting the commands to the flash memory interface unit 30, etc.), the FMI control circuit 42 may not prematurely return to processing commands from the LP command FIFO 40. Additionally, once the high priority sequence of commands is completed, software may read the LP command FIFO 40 to determine where the lower priority sequence of commands was interrupted.

In some embodiments, software may also write the register 51 to set the HPE bit. Doing so may cause the FMI control circuit 42 to interrupt processing of the LP command FIFO 40 at the next boundary (as indicated by the Y bits). Such operation may permit software to stop the processing of the LP command FIFO 40 and may permit software to examine the status of the LP command FIFO 40. Similarly, software may write a wait command (or other command that causes no change to the configuration of the flash memory interface 30 or the control registers 50) to the HP command FIFO 41, which may cause the FMI control circuit 42 to interrupt the processing of commands from the LP command FIFO 40 at an appropriate point.

As mentioned previously, a macro command may be in one of the command FIFOs 40 or 41, and the FMI control circuit 42 may perform commands from the macro memory 44 in response to the macro command. In other embodiments, the macro command may be transmitted as a PIO operation to the FMI control circuit 42. In still other embodiments, macro commands may be encountered in the command FIFOs 40 or 41, or in PIO operations. The macro command may include a starting address in the macro memory and a word count indicating the number of words to read from the macro memory 44. The FMI control circuit 42 may perform the commands in the macro prior to reading the next command (following the macro command) in the corresponding command FIFO 40 or 41. The words in the macro may include operands in addition to commands, in one embodiment. Other embodiments may use a command count rather than a word count. As mentioned above, the macro command may also include a loop count and the macro may be iterated the number of times indicated by the loop count.

Reading words from the commands FIFO 40 and 41, and from the operand FIFO 46, may include the FMI control circuit 42 deleting those words from the FIFO. Reading words from the macro memory 44, on the other hand, may not involve deleting the words so that macros may be repeatedly performed.

The FMC 48 may perform memory transfers in response to the contents of the FMC control registers 50, writing data read from the flash memory devices 28A-28B to the buffers 52A-52B or writing data read from the buffers 52A-52B to the flash memory devices 28A-28B. The buffers 52A-52B may be used in a ping-pong fashion, in which one of the buffers 52A-52B is being filled with data while the other is being drained. For example, reads from the flash memory devices 28A-28B may include the FMC 48 filling one of the buffers 52A-52B while the other buffer 52A-52B is being drained by the CDMA controller 20 performing DMA operations to memory 12. Writes to the flash memory devices 28A-28B may include the CDMA controller 20 filling one of the buffers 52A-52B with data while the FMC 48 drains the other buffer 52A-52B. The ECC unit 54 may generate ECC data for writes to the flash memory devices 28A-28B, and may check the ECC data for reads from the flash memory devices 28A-28B.

Figure 3:
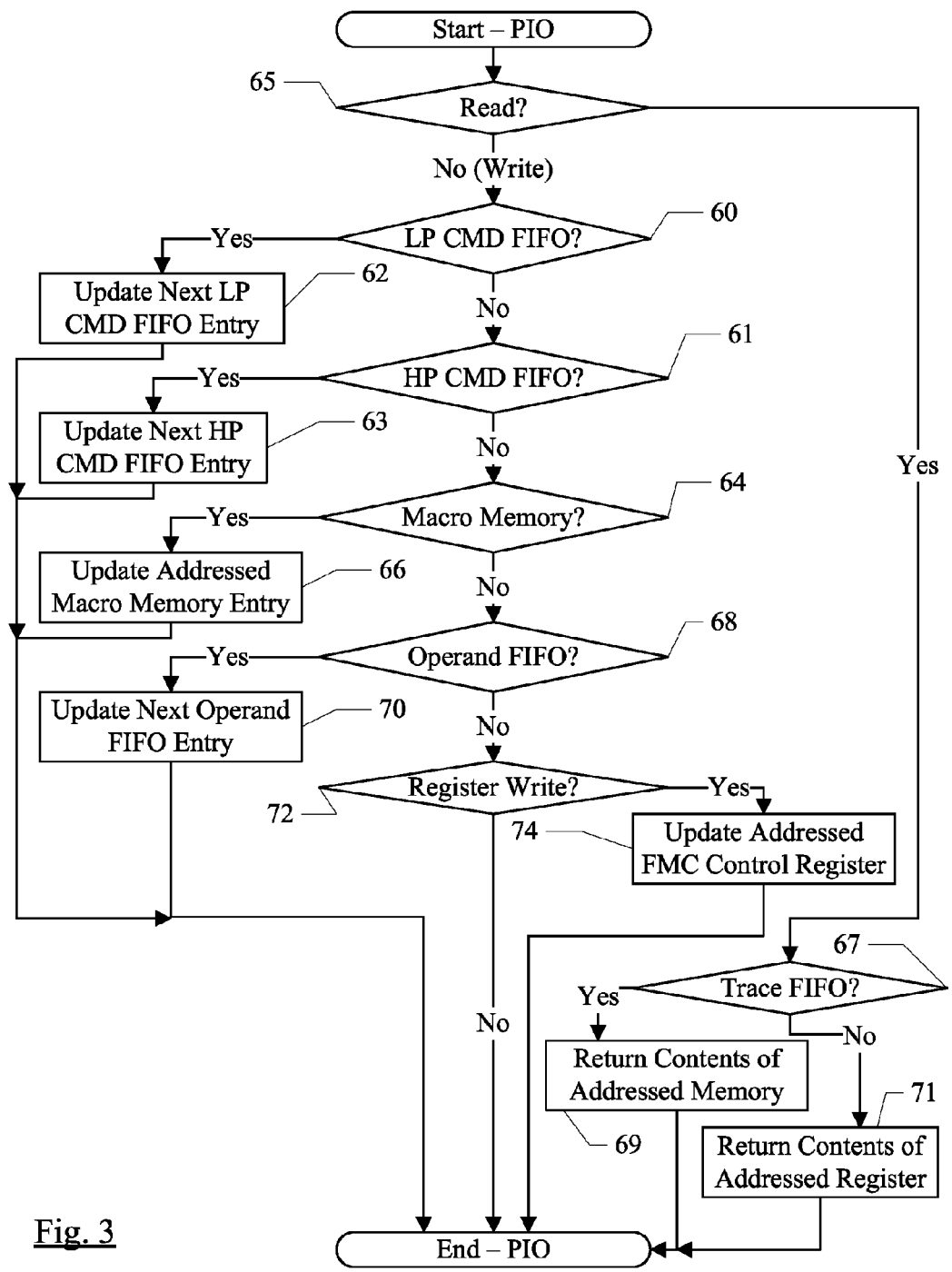
FIG. 3 is a flowchart illustrating operation of one embodiment of a flash memory interface control circuit illustrated in FIG. 2 in response to receiving a PIO operation.

Turning now to FIG. 3, a flowchart is shown illustrating operation of one embodiment of the FMI control circuit 42 in response to receiving a PIO operation from the CDMA controller 20/interconnect fabric 16/local processor. While the blocks are shown in a particular order for ease of understanding, other orders may be used. Blocks may be performed in parallel in combinatorial logic in the FMI control circuit 42. For example, the decision blocks illustrated in FIG. 3 may be independent and may be performed in parallel. Blocks, combinations of blocks, and/or the flowchart as a whole may be pipelined over multiple clock cycles. The FMI control circuit 42 may be configured to implement the operation illustrated in FIG. 3.

The PIO operation may be either a read or a write. If the PIO operation is a read (decision block 65, "yes" leg) and the address is mapped to the trace FIFO 43 (decision block 67, "yes" leg), the FMI control circuit 42 may be configured to return a contents of the entry mapped to the address of the PIO read (block 69). As mentioned previously, each entry may have a separate address, and the reading the data from an entry may be non-destructive. If the address is not mapped to the trace FIFO 43 (decision block 67, "no" leg), the FMI control circuit 42 may be configured to return a contents of the addressed register (block 71). PIO reads may also address another memory such as one of the FIFOs 40 or 41, the operand FIFO 46, or the macro memory 44. In one embodiment, the FMI control circuit 42 may maintain a trace FIFO pointer that points to the next entry to be written in the trace FIFO 43 (or the most recently written entry) and may also maintain a level indicating a number of valid entries. The trace FIFO pointer and the level may be read as PIO register reads. The trace FIFO pointer and level may be stored in the control registers 50 or may be a separate register or registers maintained by the FMI control circuit 42.

If the PIO operation is a write (decision block 65, "no" leg), the write may be handled as illustrated in the remainder of FIG. 3. If the PIO write is addressed to the LP command FIFO 40 (decision block 60, "yes" leg), the FMI control circuit 42 may be configured to update the next entry in the LP command FIFO 40 with the data from the PIO write (block 62). That is, the data from the PIO write may be appended to the tail of the LP command FIFO 40. As mentioned above, the PIO data in this embodiment may be the command and the yield bit. If the PIO write is addressed to the HP command FIFO 41 (decision block 61, "yes" leg), the FMI control circuit 42 may be configured to update the next entry in the HP command FIFO 41 with the data from the PIO write (block 63). That is, the data from the PIO write may be appended to the tail of the HP command FIFO 41. As mentioned above, the PIO data in this embodiment may be the command. If the PIO write is addressed to the macro memory 44 (decision block 64, "yes" leg), the FMI control circuit 42 may be configured to update the addressed entry in the macro memory 44 with the data from the PIO write (block 66). If the PIO write is addressed to the operand FIFO 46 (decision block 68, "yes" leg), the FMI control circuit 42 may be configured to update the next entry in the operand FIFO 46 with the data from the PIO write (block 70). That is, the data from the PIO write may be appended to the tail of the operand FIFO 46. If the PIO write is addressed to a register within the FMC control registers 50 (or other registers in the flash memory interface unit 30, in various embodiments—decision block 72, "yes" leg), the FMI control circuit 42 may be configured to update the addresses register (block 74).

Turning now to FIG. 4, a block diagram illustrating an exemplary entry 78 in the trace FIFO 43 is shown. In the illustrated embodiment, the entry 78 may be configured store a word of data that is the same size as a word in the command FIFOs 40 and 41 or the macro memory 44. Other embodiments may use different sized entries. FIG. 4 illustrates an entry that stores a command. The entry thus includes a command field that corresponds to the command (a byte, in this embodiment) and an operand field configured to store up to three operand bytes. Additionally, in one embodiment, a command source field (CS) may be included to identify a source of the command. For example, the CS field may identify one of the FIFOs 40 and 41, or the macro memory 44 as a source of the command. Some embodiments may also support a direct execution register which may be written via a PIO write to execute a command, in which case the CS field may also support an encoding identifying the direct execution register. An operand source (OS) field may identify a source of the operand data (e.g. one of the command FIFOs 40 or 41, the macro memory 44, or the operand FIFO 46). The CS field and/or the OS field may not be included in other embodiments.

Turning next to FIG. 5, a table 76 is shown illustrating an exemplary command set that may be supported by one embodiment of the flash memory interface unit 30, and more particularly the FMI control circuit 42. Other embodiments may support any other set of commands, including subsets of the commands shown in FIG. 5, subsets of the commands and other commands, and/or a superset of the commands and other commands. The table includes a "command" column listing each command, an "operands" column indicating the operands for a given command, and a "words" column indicating the number of words in the command FIFOs 40 or 41 that are occupied by the command.

The format of the commands may vary from embodiment to embodiment. For example, in one embodiment, each command may include an opcode byte that identifies the command within the command set (that is, each entry in the table 76 may be identified via a different opcode encoding). Remaining bytes in the word or words forming the command may be used to specify operands for the command. The commands may be stored in the command FIFOs 40 or 41, or the macro memory 44, in various embodiments.

The address commands (addr0 to addr7 in table 76) may be used to issue address bytes on the interface to the flash memory devices 28A-28B (more succinctly referred to as the flash memory interface). The digit after "addr" indicates the number of address bytes transmitted, starting with byte 0 of the address on the flash memory interface. The FMI control circuit 42 may be configured to pause until the address bytes have been transmitted before performing the next command, in one embodiment. The addrX commands may be equivalent to programming the following FMC control registers 50, in one embodiment: one or more address registers with the address bytes, and programming a transfer number and read/write mode in one or more registers. Responsive to the read/write mode, the FMC 48 may transmit the address bytes on the flash memory interface and may signal an address done interrupt in a status register within the FMC control registers 50. Additionally, the addrX commands may further include waiting for and clearing and address done interrupt in the status register. The addr0 command may differ from the addr1 through addr7 commands in that the address registers and address transfer number register are not programmed. Instead these registers may be preprogrammed using other commands such as the load_next_word or load_from_fifo commands described below.

The cmd command may be used to send a flash memory interface command out on the flash memory interface. In one embodiment, flash memory interface commands are one byte. Accordingly, the operand of the cmd command may be the command byte may be transmitted on the flash memory interface. The FMI control circuit 42 may be configured to pause until the cmd command is completed on the flash memory interface. The cmd command may be equivalent to programming a command register in the FMC control registers 50 with the command byte; setting a command mode bit in another FMC control register 50; and waiting for and clearing a cmd done interrupt in a status register within the FMC control registers 50. Responsive to the setting of the command mode bit, the FMC 48 may be configured to transmit the command byte on the flash memory interface and may write the cmd done interrupt to the status register.

The enable_chip command may be used to write a chip enable register of the FMC control registers 50, which may cause the FMC 48 to drive chip enable signals on the flash memory interface based on the chip enable operand.

The xfer_page command may be used to initiate a page transfer to/from the flash memory devices 28A-28B. In response to the xfer_page command, the FMI control circuit 42 may be configured to set a start bit in an FMC control register 50 and wait for and clear a page done interrupt bit in another FMC control register 50. In response to the start bit, the FMC 48 may be configured to perform the specified page transfer, and set the page done interrupt upon completion.

There may be various synchronizing command supported by the FMI control circuit 42. Generally, a synchronizing command may be used to specify an event that the FMI control circuit 42 is to monitor for, and may cause the FMI control circuit 42 to wait for the event to occur (i.e. wait until the FMI control circuit 42 detects the event) prior to performing the next command. Thus, synchronizing commands may permit sequences of commands to be preprogrammed, and the synchronizing commands may help ensure the correct timing. For example, multiple page transfers may be preprogrammed, and synchronizing commands may be used to delay programming of the FMC control registers 50 for the next page until the registers are no longer needed for the current page (e.g. after the last data from the page is loaded into the buffer 52A-52B for a read).

In the embodiment of FIG. 5, the synchronizing commands may include wait_for_rdy, pause, timed_wait, and wait_for_int. The wait_for_rdy command may be used to monitor the status of the flash memory devices 28A-28B during a page transfer. The wait_for_rdy command may include waiting for and clearing a specific "done" interrupt (e.g. page done) in the status register of the FMC control registers 50; masking a status byte in the status register with the mask operand, and comparing the masked status byte to the condition operand. If the masked status byte matches the condition operand, the FMI control circuit 42 may be configured to perform the next command. Otherwise, the FMI control circuit 42 may signal an interrupt (e.g. to the IOP 32 or the processor 22, in various embodiments) and may stop performing additional commands until the IOP 32/processor 22 services the interrupt.

The pause command may be used to pause command performance by the FMI control circuit 42. The FMI control circuit 42 may cease performing commands until specifically unpaused by software executing on the IOP 32/processor 22 writing a specified enable bit in one of the FMC control registers 50.

The FMI control circuit 42 may be configured to pause and resume after a number of clock cycles via the timed_wait command. The number of clock cycles is specified as the operand of the timed_wait command. In some embodiments, the timed_wait command may be used to slow down the flash memory interface unit 30, because the performance possible using the command FIFO 40, the macro memory 44, and the operand FIFO 46 may exceed the rate at which activities may be performed by the flash memory devices 28A-28B.

The wait_for_int command may be used to cause the FMI control circuit 42 to wait for a specified interrupt value. The operands may specify the interrupt (irq) to be waited on, and the state of the irq bit to be waited on (e.g. set or clear), using the "bit" operand.

The send_interrupt command may be used to send a specified interrupt to the IOP 32 or processor 22. The operand of the send_interrupt command may specify an interrupt code to write into an interrupt code register of the FMC control registers 50, which may cause the interrupt to be sent.

The load_next_word and load_from_fifo commands may be used to program various registers in the FMC control registers 50. One of the operands of these commands is the register address of the control register to be written. In response to the load_next_word command, the FMI control circuit 42 may read the next word from the command FIFO 40 and write the word to the addressed register. In response to the load_from_fifo command, the FMI control circuit 42 may be configured to read the word at the head of the operand FIFO 46 and write the word to the addressed register.

The macro command may be used to cause the FMI control circuit 42 to read commands from the macro memory 44. The macro command includes an address operand, a length operand, and a loop count operand. The address may identify the first word to be read from the macro memory 44, and the length may identify the length of the macro (e.g. in terms of number of commands or number of words). In one embodiment, the length is the number of words. The loop count may indicate a number of iterations of the macro to be performed. In one embodiment, the loop count operand may be one less than the number of iterations (e.g. a loop count of zero is one iteration, a loop count of one is two iterations, etc.). Once a macro completes the next command FIFO 42 may be read (i.e. there may be no return command in the macro).

The poll command may be to poll any register in the FMC control registers 50 for a specified value (after masking the value read from the register using the mask field). The FMI control circuit 42 may poll the register until the specified value is detected, then proceed to the next command.

As noted in the above description, the FMI control circuit 42 may monitor for various interrupts recorded in one or more status registers within the FMC control registers 50 as part of performing certain commands. The FMI control circuit 42 may clear the interrupt and complete the corresponding command. In the absence of commands in the command FIFO 40, the interrupts may instead be forwarded to the IOP 32/processor 22 (if enabled). Accordingly, PIO write operations to the FMC control registers 50 and interrupts to the IOP 32/processor 22 may be another mechanism to perform memory transfers to/from the flash memory devices 28A-28B.

Figure 6:
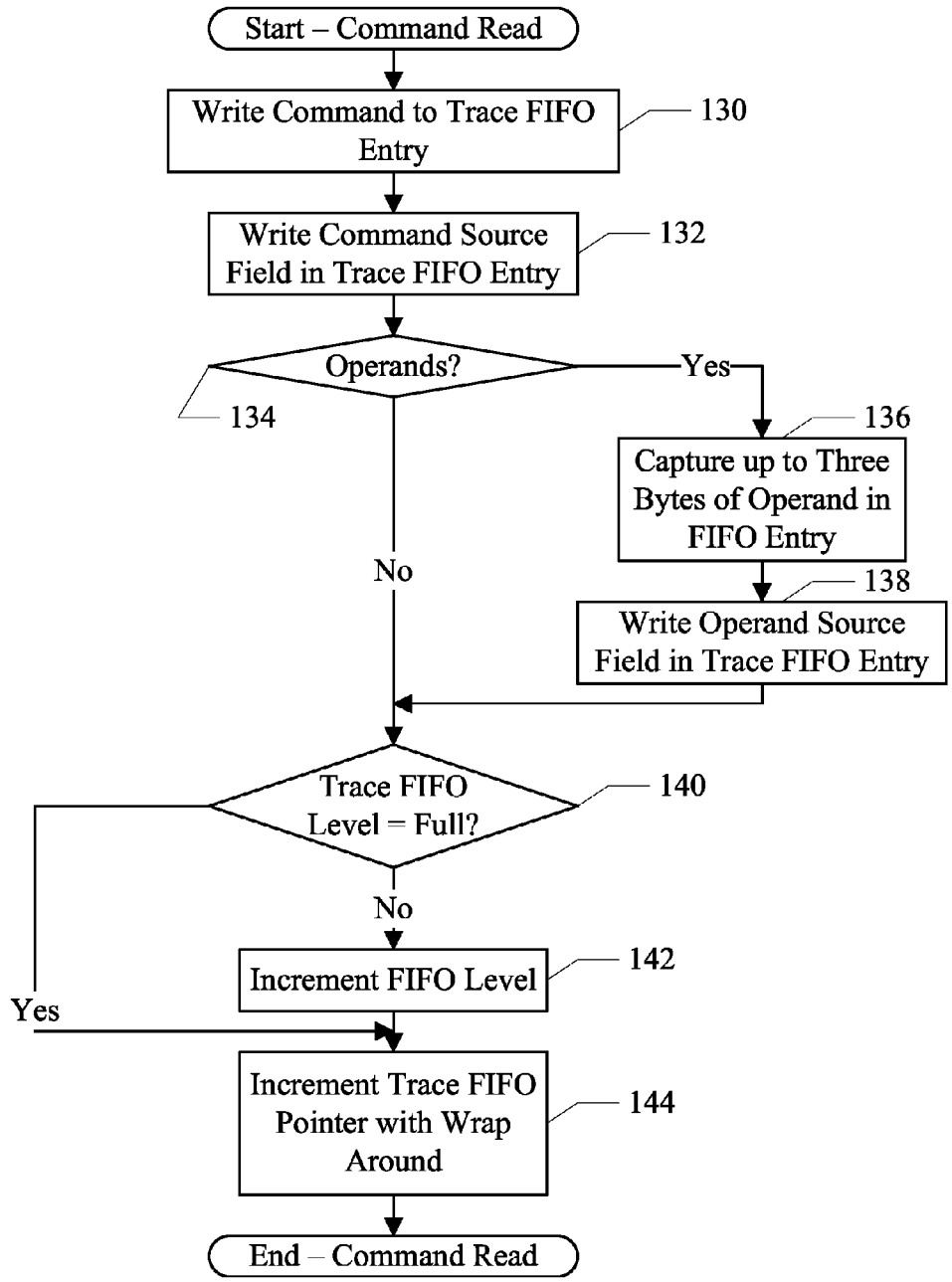
FIG. 6 is a flowchart illustrating one embodiment of a trace FIFO update.

Turning now to FIG. 6, a flowchart is shown illustrating operation of one embodiment of the FMI control circuit 42 for recording commands in the trace FIFO 43. The operation illustrating in FIG. 6 may occur at any time that the FMI control circuit 42 reads a command from one of the FIFOs 40 and 41 or the macro memory 44. For example, the operation may occur during the command reads discussed below with regard to FIGS. 7 and 8. While the blocks are shown in a particular order for ease of understanding, other orders may be used. Blocks may be performed in parallel in combinatorial logic in the FMI control circuit 42. Blocks, combinations of blocks, and/or the flowchart as a whole may be pipelined over multiple clock cycles. The FMI control circuit 42 may be configured to implement the operation illustrated in FIG. 6.

The FMI control circuit 42 may be configured to write the command to the next available trace FIFO entry (block 130). The next available trace FIFO entry may be identified via a trace FIFO pointer maintained by the FMI control circuit 42. Additionally, in embodiments that implement the command source field in the trace FIFO entries, the FMI control circuit 42 may be configured to write the command source field to identify the source of the command (block 132). If the command includes one or more operands (decision block 134, "yes" leg), the FMI control circuit 42 may be configured to capture up to three operand bytes in the same entry as the command (block 136). In other embodiments, the number of bytes captured may vary. In some embodiments, if there are additional operand bytes that may not be stored in the entry with the command, the bytes may be captured in the next consecutive entry. Other embodiments may not capture the additional bytes. In embodiments which implement the operand source field, the FMI control circuit 42 may be configured to write the operand source field with an identification of the source of the operands (e.g. the same location as the command, or the operand FIFO 46) (block 138).

In addition to the trace FIFO pointer, the FMI control circuit 42 may be configured to maintain a trace FIFO level indicative of a fullness of the trace FIFO 43. For example, the trace FIFO level may be a count of the number of entries that are storing valid data, and the count may saturate at the number of entries in the trace FIFO 43. With the trace FIFO level and the trace FIFO pointer, software may determine which entries in the trace FIFO 43 contain data and the order of the entries.

Accordingly, the FMI control circuit 42 may be configured to update the trace FIFO level if the trace FIFO level is not indicating full (decision block 140, "no" leg and block 142). In either case, the FMI control circuit 42 may be configured to increment the trace FIFO pointer with wrap around if the pointer extends to the end of the trace FIFO 43 (block 144). That is, the FMI control circuit 42 may operand the trace FIFO 43 as a circular buffer.

Figure 7:
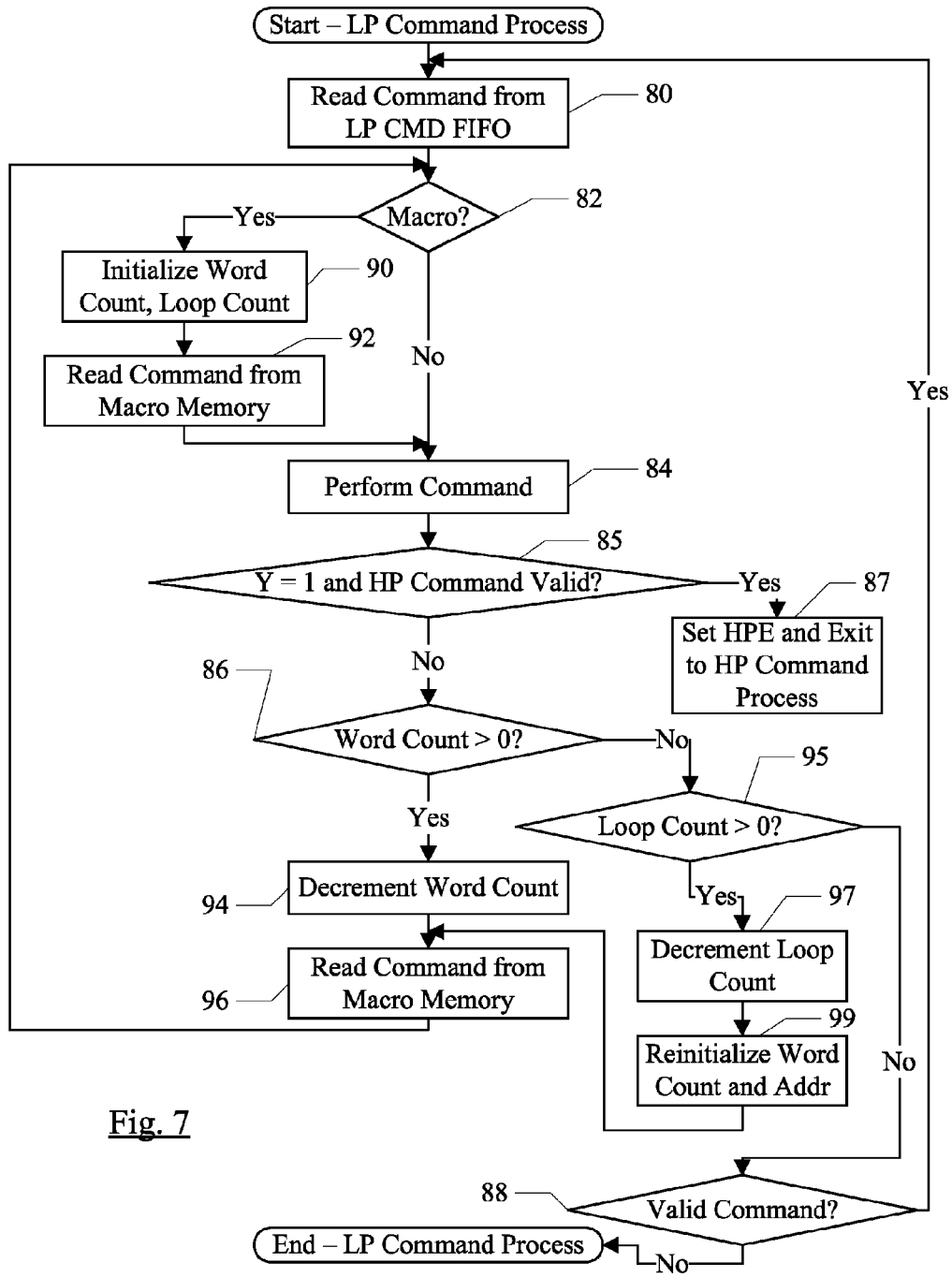
FIG. 7 is a flowchart illustrating operation of one embodiment of the flash memory interface control circuit shown in FIG. 2 in response to reading a command from a low priority command FIFO.

Turning now to FIG. 7, a flowchart is shown illustrating operation of one embodiment of the FMI control circuit 42 to process a command from the LP command queue 40. While the blocks are shown in a particular order for ease of understanding, other orders may be used. Blocks may be performed in parallel in combinatorial logic in the FMI control circuit 42. Blocks, combinations of blocks, and/or the flowchart as a whole may be pipelined over multiple clock cycles. The FMI control circuit 42 may be configured to implement the operation illustrated in FIG. 7.

The FMI control circuit 42 may be configured to read a command from the LP command FIFO 40 (block 80). If the command is not a macro command (decision block 82, "no" leg), the FMI control circuit 42 may be configured to perform the command (block 84). Once the command completes, and if the yield (Y) bit is set and there is a valid command in the HP command queue 41 (decision block 85, "yes" leg), the FMI control circuit 42 may be configured to set the HPE bit in the register 51 and exit to the HP command processing (e.g. to FIG. 8) (block 87). Similarly, in some embodiments, the FMI control circuit 42 may be configured to exit to the HP command processing (or at least to cease low priority processing) responsive to the HPE bit being set (e.g. by software writing the register 51). Otherwise (decision block 84, "no" leg), the FMI control circuit 42 may be configured to check a word count used to determine if a macro has reached its end. If the command is not part of a macro, the word count may be zero (decision block 86, "no" leg). The FMI control circuit 42 may be configured to check the loop count associated with the macro command. If the command is not part of a macro, the loop count may be zero (decision block 95, "no" leg). The FMI control circuit 42 may be configured to determine if there is another valid command in the command FIFO 40 (decision block 88). That is, the FMI control circuit 42 may be configured to determine if the command FIFO 40 is empty. If there is another valid command (decision block 88, "yes" leg), the FMI control circuit 42 may be configured to read and process the next command. Otherwise, the FMI control circuit 42's command processing circuitry may be idle until another valid command is written to the command FIFO 40 (decision block 88, "no" leg).

If the command is a macro command (decision block 82, "yes" leg), the FMI control circuit 42 may be configured to initialize the word count to the length operand of the macro command and to initialize the loop count to the loop count operand of the macro command (block 90). The FMI control circuit 42 may also read a command from the macro memory 44 (block 92). Specifically, in this case, the FMI control circuit 42 may read the first word from the address in the macro memory 44 provided as the address operand of the macro command. The FMI control circuit 42 may be configured to perform the command (block 84), and may be configured to check the word count (in this case there may be no Y bit and thus the decision block 85 may result in the "no" leg). The word count may be greater than zero (decision block 86, "yes" leg), and the FMI control circuit 42 may be configured to decrement the word count and to read the next command from the macro memory 44 (e.g. by incrementing the address) (blocks 94 and 96). The FMI control circuit 42 may be configured to process the next command (returning to decision block 82 in the flowchart of FIG. 7). If the word count is zero (decision block 86, "no" leg), the FMI control circuit 42 may be configured to check the loop count. If the loop count is greater than zero (decision block 95, "yes" leg), another iteration of the macro is to be performed. The FMI control circuit 42 may decrement the loop count (block 97), reinitialize the word count and the macro address (block 99), and read the next command from the macro memory 44 (i.e. the first command of the macro) (block 96). If both the word count and loop count are zero (decision block 86 and 5, "no" legs), the macro is complete and the FMI control circuit 42 may check for the next valid command in the command queue 40 (decision block 88).

It is noted that, since each command is checked for being a macro command, macro commands may be stored in the macro memory 44 as well. Accordingly, macros may be "nested", although the last macro to be performed returns to the command FIFO 40 so there isn't true nesting in the sense that macros do not return to macros that called them.

Figure 8:
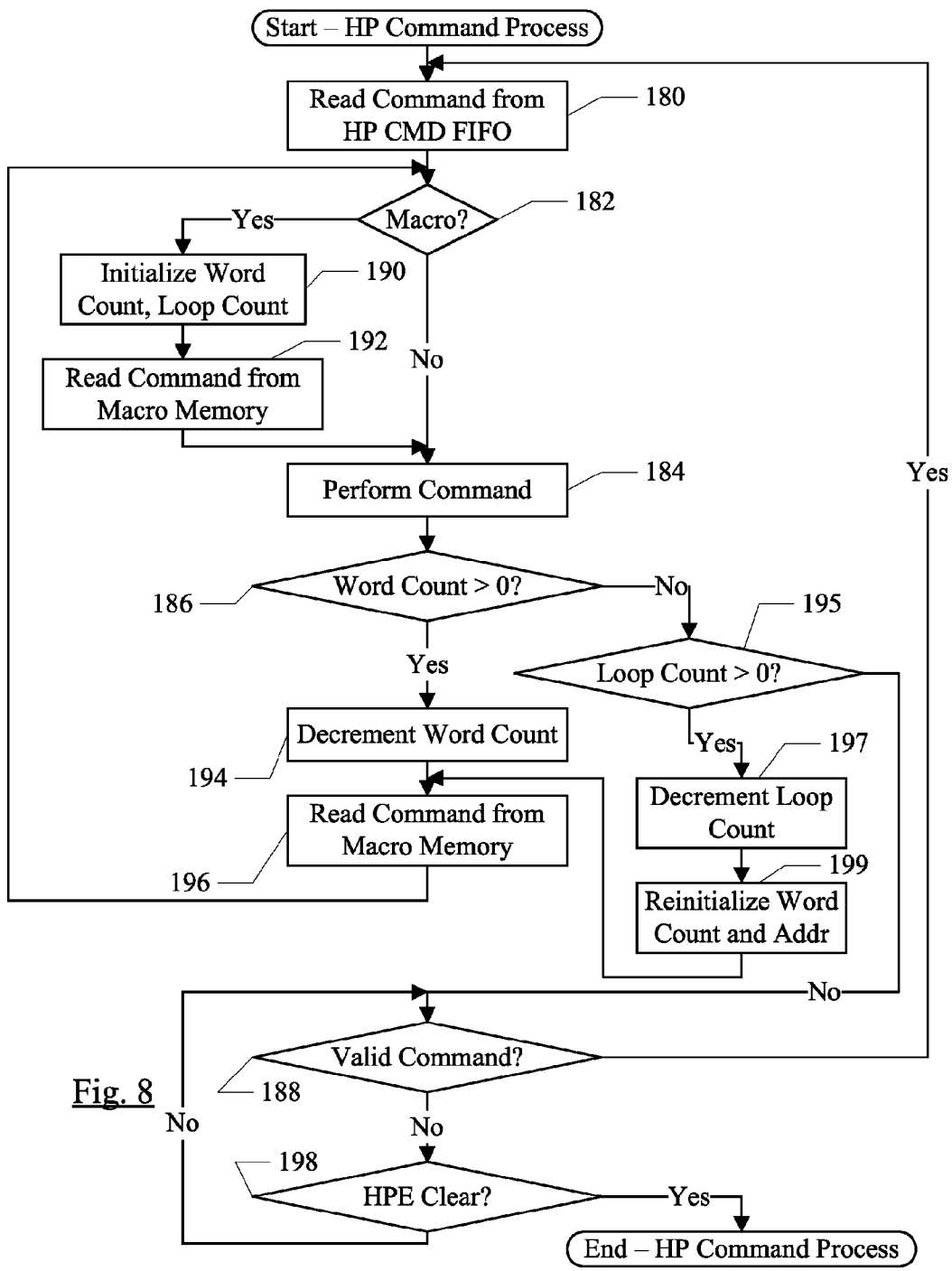
FIG. 8 is a flowchart illustrating operation of one embodiment of the flash memory interface control circuit shown in FIG. 2 in response to reading a command from a high priority command FIFO.

FIG. 8 is a flowchart illustrating operation of one embodiment of the FMI control circuit 42 to process a command from the HP command queue 41. That is, processing as illustrated in FIG. 8 may be initiated in response to exiting the LP processing as discussed above with regard to FIG. 7 (block 87). While the blocks are shown in a particular order for ease of understanding, other orders may be used. Blocks may be performed in parallel in combinatorial logic in the FMI control circuit 42. Blocks, combinations of blocks, and/or the flowchart as a whole may be pipelined over multiple clock cycles. The FMI control circuit 42 may be configured to implement the operation illustrated in FIG. 8.

The FMI control circuit 42 may be configured to read a command from the HP command FIFO 40 (block 180). If the command is not a macro command (decision block 182, "no" leg), the FMI control circuit 42 may be configured to perform the command (block 184). Once the command completes, the FMI control circuit 42 may be configured to check a word count used to determine if a macro has reached its end. If the command is not part of a macro, the word count may be zero (decision block 186, "no" leg). The FMI control circuit 42 may be configured to check the loop count associated with the macro command. If the command is not part of a macro, the loop count may be zero (decision block 195, "no" leg). The FMI control circuit 42 may be configured to determine if there is another valid command in the HP command FIFO 41 (decision block 188). That is, the FMI control circuit 42 may be configured to determine if the HP command FIFO 41 is empty. If there is another valid command (decision block 188, "yes" leg), the FMI control circuit 42 may be configured to read and process the next command. Otherwise, the FMI control circuit 42 may check if the HPE bit is clear (decision block 198). If so, the FMI control circuit 42 my return to LP command processing (decision block 198, "yes" leg). If not (decision block 198, "no" leg), the FMI control circuit 42 may be idle until either a valid command appears in the HP command FIFO 41 or the HPE bit is cleared.

If the command is a macro command (decision block 182, "yes" leg), the FMI control circuit 42 may be configured to initialize the word count to the length operand of the macro command and to initialize the loop count to the loop count operand of the macro command (block 190). The FMI control circuit 42 may also read a command from the macro memory 44 (block 192). Specifically, in this case, the FMI control circuit 42 may read the first word from the address in the macro memory 44 provided as the address operand of the macro command. The FMI control circuit 42 may be configured to perform the command (block 184), and may be configured to check the word count. The word count may be greater than zero (decision block 186, "yes" leg), and the FMI control circuit 42 may be configured to decrement the word count and to read the next command from the macro memory 44 (e.g. by incrementing the address) (blocks 194 and 196). The FMI control circuit 42 may be configured to process the next command (returning to decision block 182 in the flowchart of FIG. 8). If the word count is zero (decision block 186, "no" leg), the FMI control circuit 42 may be configured to check the loop count. If the loop count is greater than zero (decision block 195, "yes" leg), another iteration of the macro is to be performed. The FMI control circuit 42 may decrement the loop count (block 197), reinitialize the word count and the macro address (block 199), and read the next command from the macro memory 44 (i.e. the first command of the macro) (block 196). If both the word count and loop count are zero (decision block 186 and 195, "no" legs), the macro is complete and the FMI control circuit 42 may check for the next valid command in the HP command FIFO 41 (decision block 188).

Figure 9:
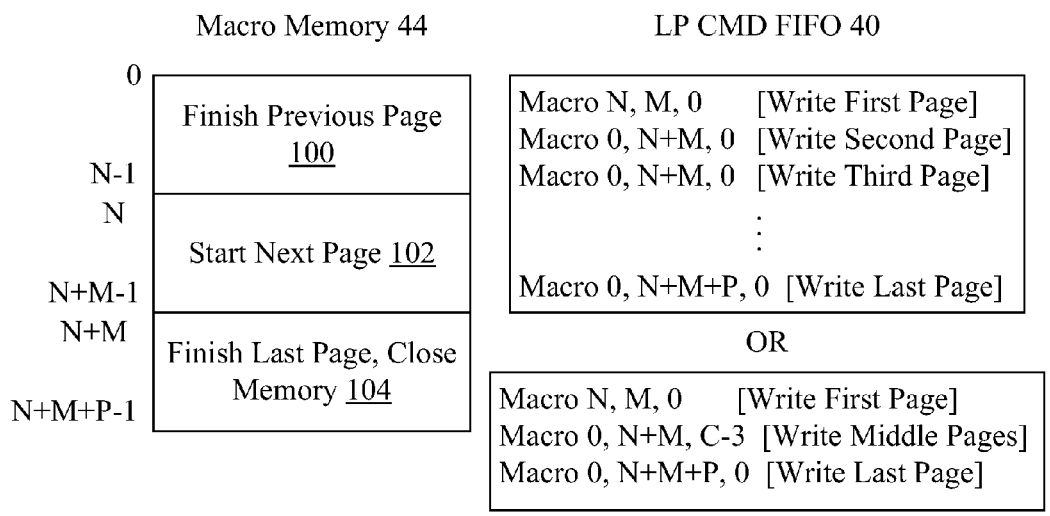
FIG. 9 is a block diagram of an example use of a macro memory.

Turning now to FIG. 9, a block diagram of an example of a use of macros to perform a multiple page write to a flash memory device 28A or 28B is shown. A contents of the macro memory 44 is shown, including three sections of commands. Between macro memory address 0 and N−1, N words of macro 100 to complete a write to the previous page are stored. Between macro memory address N and N+M−1, M words of macro 102 to start a write to a next page are stored. Between macro memory address N+M and N+M+P−1, P words of macro 104 are stored to finish a last page of a write to memory.

A set of commands in the LP command FIFO 40 are illustrated in FIG. 9, with a head of the FIFO at the top of the LP command FIFO 40 and the subsequent commands in the FIFO proceeding in order down the LP command FIFO 40 as illustrated in FIG. 9. The first command is macro N, M. The command calls the macro 104, beginning at word N, and performs M words (i.e. the macro 102 as illustrated in FIG. 8). Thus, the write to the first page is initialized. Subsequent page writes may be performed using the macro 0, N+M commands. These commands cause the macro 100 and the macro 102 to be performed. The write to the previous page may be completed (macro 100) and the write to the next page may be started (macro 102). The last page may be written using the macro 0, N+M+P command. This command causes the macros 100, 102, and 104 to be performed, completing the write to the second to last page (macro 100), performing the write to the last page (macro 102), and completing the write to the last page and closing the flash memory device 28A or 28B (macro 104). In this example, the loop count operand of each macro command is zero (one iteration). However, in another example, shown below the first example in FIG. 9, the loop count operand may be used to make the commands in the command queue even more efficient. The loop count of the macro N, M command for the first page and the macro 0, N+M+P command for the last page may still be zero, specifying one iteration. However, the middle pages of the write may all be accomplished using one macro command (macro 0, N+M) with a loop count operand equal to the page count (C) minus 3. The loop count is C−3 to account for the first and last page, as well as the fact that the loop count operand is one less than the desired number of iterations in this embodiment. As the macros 100, 102, and 104 illustrate, through careful arrangement of the macros in the macro memory 44, dense and efficient macros may result. The macros may employ load_from_fifo commands to use different operands for each page write operand, and the operands for each page may be loaded into the operand FIFO 46 prior to initiating the commands in the LP command FIFO 40.

The commands included in the macro 102 may establish the address to be written, chip enables, etc. The commands included in the macro 100 may include xfer_page to transfer the previous page to the memory, and commands to check for errors and synchronize the next page transfer (which may be initialized via the macro 102). The macro 104 may include the final xfer_page command, as well as commands to check for errors and to close the flash memory device that was the target of the writes, deactivating the active page/region and/or performing any other operations as specified for the flash memory device.

Figure 10:
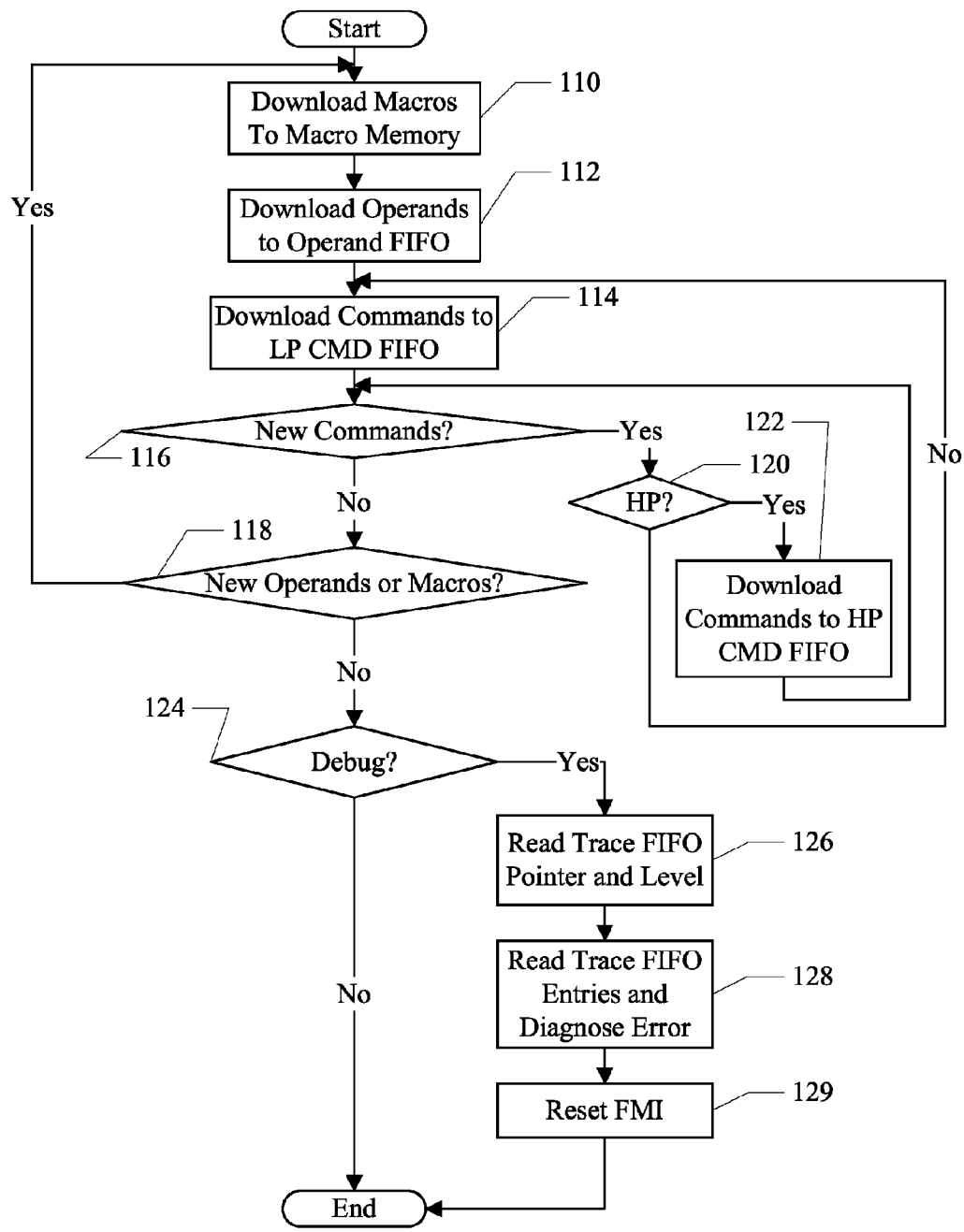
FIG. 10 is a flowchart illustrating operation of one embodiment of flash memory interface code executed by one embodiment of a processor shown in FIG. 1.

Turning now to FIG. 10, a flowchart illustrating operation of a flash code to be executed by the IOP 32 and/or the processor 22 is shown. While the blocks are shown in a particular order for ease of understanding, other orders may be used. The flash code may include instructions which, when executed by the IOP 32 and/or the processor 22, may implement the operation illustrated in FIG. 10.

The flash code may be executed at any time during operation of the integrated circuit 10. For example, the flash code may be executed to initialize the flash memory interface unit 30. The flash code may also be executed at any time that the flash memory 30 has been idle but is to be accessed, to reconfigure the macros in the macro memory 44, etc.

The flash code may download any desired macros to the macro memory 44 (block 110). If the macros already stored in the macro memory 44 are the desired macros, or if there are no desired macros, block 110 may be skipped. The flash code may also download any operands to be used by the commands or the macros (block 112), and block 112 may be skipped if there are no operands to be downloaded. The flash code may download the commands to be performed to the LP command FIFO 40 (block 114), and command performance may begin in the flash memory interface unit 30. Downloading the commands to the LP command FIFO 50 may include setting the Y bits for those commands that represent the completion of a portion of the operations, such that interruption of the commands for high priority commands is permissible and clearing other Y bits. If additional commands are ready to be downloaded (decision block 116, "yes" leg), and those commands are higher priority than the commands currently being performed by the flash memory interface unit 30 (decision block 120, "yes" leg), the flash code may download the additional commands to the HP command FIFO 41 (block 122). Otherwise (decision block 120, "no" leg, the flash code may download the commands to the LP command FIFO 40 (block 114). If new operands or macros are ready to be downloaded (decision block 118, "yes" leg), the flash code may return to blocks 110 and/or 112 to download them. Additionally, upon completion of the HP commands, the flash code may reset the HPE bit in the register 51 (not shown in FIG. 10).

If an error is reported (e.g. via interrupt, or via the flash code polling a status register, or any other mechanism), the flash code may determine that debugging is desired (decision block 124, "yes" leg). The flash code read the trace FIFO pointer and level (block 126) and may determine which entries to read and the order of the entries. The flash code may then read trace FIFO entries and diagnose the error (block 128). For example, if the error is a data error or cyclical redundancy check (CRC) error or other ECC error from the flash memory 28A-28B, the operands may be used to determine that page containing the error and corrective action may be taken. Corrective action may include, e.g., correcting the error in the memory or mapping the page out as failed to prevent further use. Once the error is diagnosed, the flash code may reset the flash memory interface unit 30 (block 129).

System and Computer Accessible Storage Medium

Figure 11:
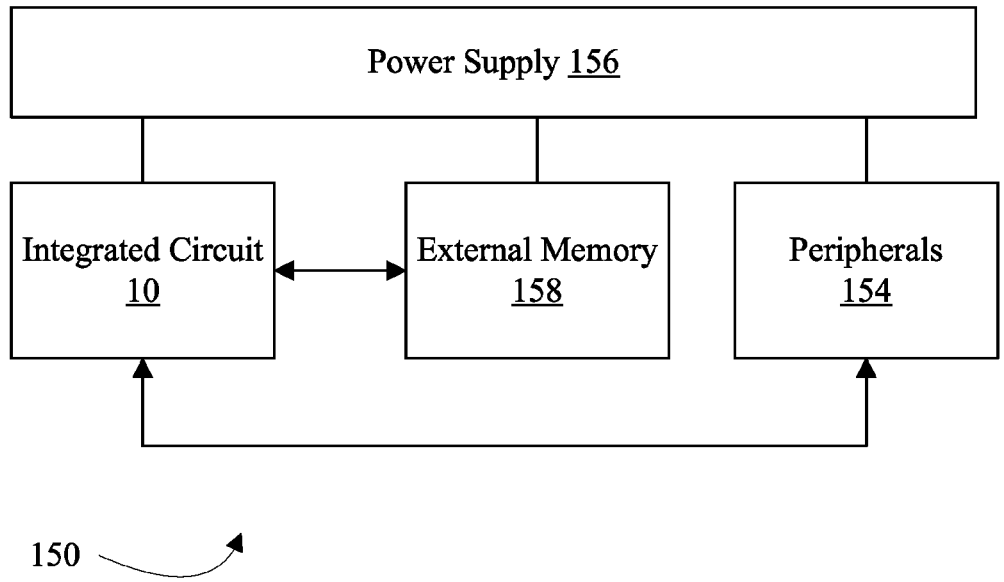
FIG. 11 is a block diagram of one embodiment of a system including the apparatus illustrated in FIG. 1.

Turning next to FIG. 11, a block diagram of one embodiment of a system 150 is shown. In the illustrated embodiment, the system 150 includes at least one instance of an integrated circuit 10 (from FIG. 1) coupled to one or more peripherals 154 and an external memory 158. The external memory 158 may include the memory 12 and/or the flash memory 28A-28B. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, etc. The external memory 158 may include one or more memory modules to which the memory devices are mounted, such as single inline memory modules (SIMMs), dual inline memory modules (DIMMs), etc.

Figure 12:
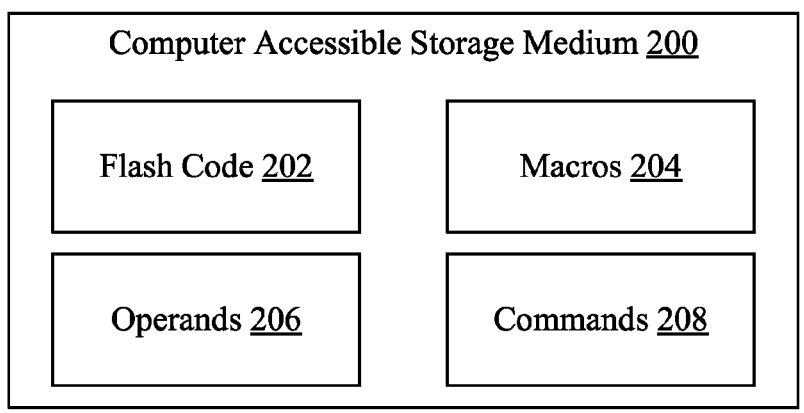
FIG. 12 is a block diagram of one embodiment of a computer accessible storage medium.

Turning now to FIG. 12, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS). The computer accessible storage medium 200 in FIG. 12 may store flash code 202, which may include code executable by the IOP 32 and/or the processor 22. The flash code 202 may include instructions which, when executed, implement the operation described above with regard to FIG. 10. Generally, the computer accessible storage medium 200 may store any set of instructions which, when executed, implement a portion or all of the operation shown in FIG. 10. Furthermore, the computer accessible storage medium 200 may store one or more macros 204 to be downloaded to the macro memory 44, one or more operands to be downloaded to the operand FIFO 36, and/or one or more commands to be downloaded to the command FIFO 40. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. An apparatus to control an external interface in an integrated circuit, the apparatus comprising:
  a plurality of command sources, wherein each of the plurality of command sources is configured to provide an independent sequence of commands, wherein a first command source is a command queue and a second command source is a macro memory;
  a trace queue comprising a plurality of entries, wherein each of the plurality of entries is configured to store data describing a respective command; and
  a control circuit coupled to the plurality of command sources and the trace queue, wherein the control circuit is configured to select commands from the plurality of command sources for processing, and wherein the control circuit is configured to write data corresponding to the selected commands to the trace queue in an order of processing even in a case that consecutive commands are selected from different ones of the plurality of command sources, and wherein the control circuit is configured to process commands from the macro memory responsive to a macro command in the command queue, and wherein the control circuit is configured to write data describing the macro command to a first entry of the trace queue, and wherein the control circuit is configured to write data describing an initial command from the macro memory to a second entry of the trace queue, and wherein the first entry is adjacent to the second entry.

2. The apparatus as recited in claim 1 wherein the sequence of commands from the first command source program a controller to perform a transfer on the external interface.

3. The apparatus as recited in claim 2 wherein the sequence of commands from a third command source of the plurality of command sources program the controller to perform a different transfer on the external interface.

4. The apparatus as recited in claim 1 wherein the first command source is a low priority command queue and a third command source is a high priority command queue, and wherein the control circuit is configured to interrupt processing of commands in the low priority command queue to process commands in the high priority command queue, and wherein the control circuit is configured to write data describing a most recent command processed from the low priority command queue prior to interrupting the processing in a third entry of the trace queue, and wherein the control circuit is configured to write data describing an initial command from the high priority command queue in response to the interrupting to a fourth entry of the trace queue, and wherein the third entry is adjacent to the fourth entry.

5. The apparatus as recited in claim 1 wherein the data describing the respective command includes at least a portion of the command and at least a portion of one or more operands processed by the command.

6. The apparatus as recited in claim 5 wherein the data describing the respective command includes an identifier of which one of the plurality of sources is a source of the command.

7. The apparatus as recited in claim 5 wherein the data describing the respective command includes an identifier of a source of the one or more operands.

8. The apparatus as recited in claim 5 wherein the one or more operands are read from an operand queue in the apparatus.

9. An integrated circuit comprising:
a memory controller configured to couple to one or more memory devices;
a flash memory interface unit configured to couple to one or more flash memory devices;
a direct memory access (DMA) controller coupled to the memory controller and the flash memory interface unit, wherein the DMA controller is configured to perform DMA operations between the memory controller and the flash memory interface unit; and
a processor configured to control the flash memory interface unit;
wherein the flash memory interface unit comprises a low priority command queue and a high priority command queue, and wherein the processor is configured to write a first plurality of commands to the low priority command queue to control a first transfer between the flash memory interface unit and the one or more flash memory devices, and wherein the processor is configured to write a second plurality of commands to the high priority command queue to control a second transfer between the flash memory interface unit and the one or more flash memory devices prior to the completion of the first transfer, and wherein the flash memory interface unit comprises a trace queue comprising a plurality of entries, each entry configured to store at least a portion of a command performed by the flash memory interface unit, wherein an order of commands represented in the trace queue is an order that the commands were performed independent of which of the high priority command queue and the low priority command queue sourced the commands.

10. The integrated circuit as recited in claim 9 wherein, at a first point in time during use, a first subset of the commands represented in the trace queue were sourced from the low priority queue and a second subset of the commands represented in the trace queue were sourced from the high priority queue.

11. The integrated circuit as recited in claim 9 wherein each of the plurality of entries further stores at least a portion of one or more operands of the command.

12. The integrated circuit as recited in claim 11 wherein each of the plurality of entries further identifies a source of the one or more operands.

13. The integrated circuit as recited in claim 9 wherein each of the plurality of entries further identifies a source of the command, wherein potential sources include the high priority command queue and the low priority command queue.

14. The integrated circuit as recited in claim 13 wherein the potential sources include a macro memory configured to store one or more macros.

15. A non-transitory computer readable storage medium storing a plurality of instructions which, when executed on an processor in an integrated circuit that also includes a memory interface unit that comprises a plurality of command sources configured to store commands to control a memory controller coupled to an external memory interface, and the memory interface unit further comprises a trace queue configured to store an ordered set of data representing commands that have been performed by the memory interface unit:
read the trace queue in response to detection of an error from the memory interface unit; and
determine the commands that were performed prior to detection of the error responsive to the trace queue, wherein the ordered set of data represents an order of the commands even in the case that commands were sourced from more than one of the plurality of command sources.

16. The non-transitory computer readable storage medium as recited in claim 15 wherein the plurality of instructions, when executed, diagnose the detected error.

* * * * *